Aug. 2, 1949.
H. KLEMPERER
2,477,622
CONDENSER WELDING SYSTEM
Filed May 1, 1945
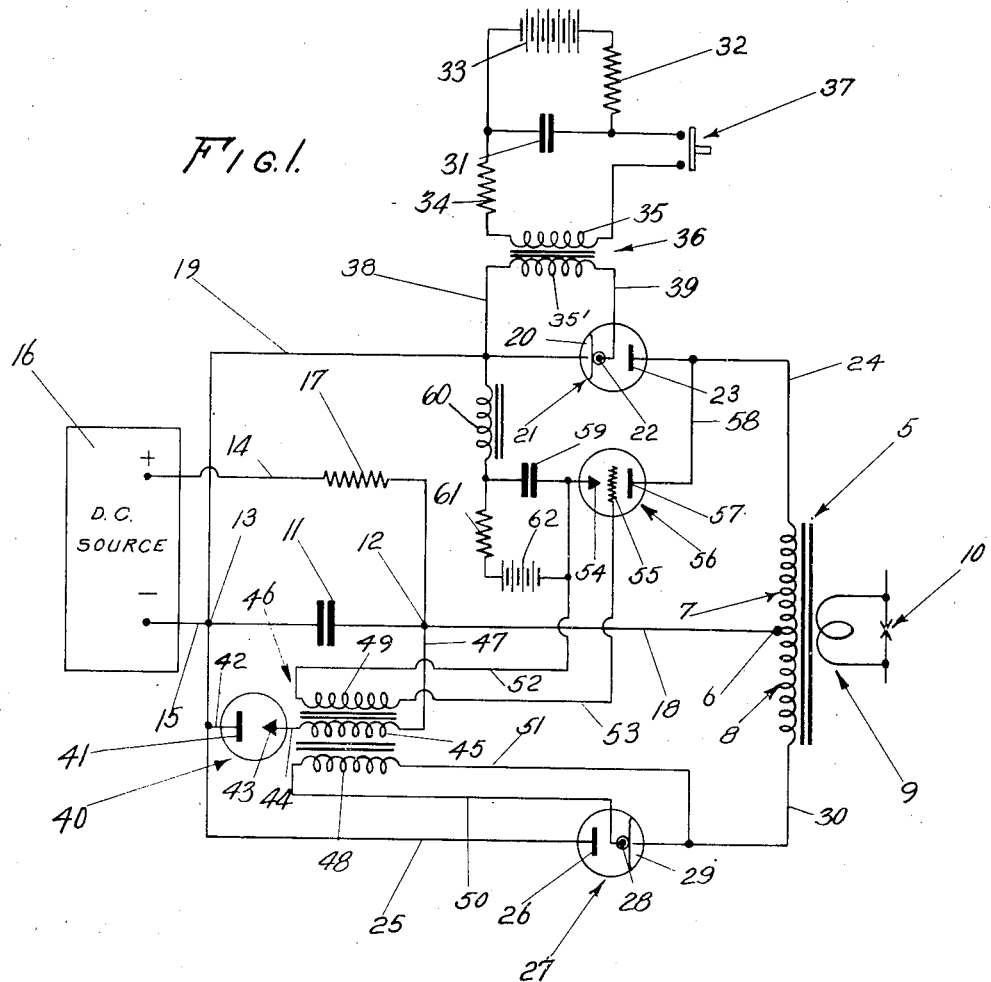
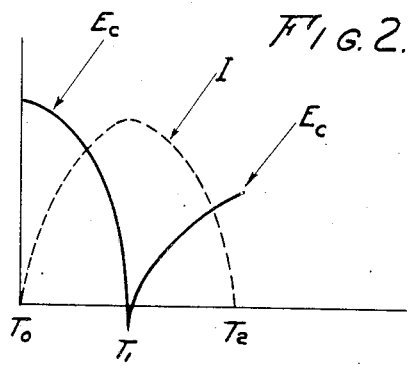
INVENTOR.
HANS KLEMPERER,
BY Elmer J. Gorn
ATTY.

Patented Aug. 2, 1949

2,477,622

UNITED STATES PATENT OFFICE 2,477,622

CONDENSER WELDING SYSTEM

Hans Klemperer, Belmont, Mass., assignor to Raytheon Manufacturing Company, Newton, Mass., a corporation of Delaware Application May 1, 1945, Serial No. 591,256

12 Claims. (Cl. 219—4)

1

My present invention relates to welding systems, and more particularly to welding systems in which electrical energy is stored in a capacitor and then discharged through a resistance-welding load.

My present invention has special application to systems in which the welding-current pattern substantially follows a half-cycle sine wave.

Heretofore, the energy stored in such a system as a result of the rise of the welding current to its maximum value has, after the discharge of the capacitor, recharged the same with its original polarity reversed, thereby resulting in a waste of energy.

It is, therefore, the main object of my present invention to provide a welding circuit which presents such a path to the welding current that, after the capacitor in which the welding energy is originally stored becomes discharged, said capacitor is recharged with its original polarity.

It is a further object of my present invention to accomplish the foregoing in a simple manner and with a minimum of circuit components.

These, and other objects of my present invention which will become more apparent as the detailed description thereof progresses, are attained, briefly, in the following manner:

The welding-energy capacitor is charged in the usual manner, but it is so connected to the load circuit that when the welding current reaches substantially its maximum value, and said capacitor commences to recharge with reversed polarity, a current pulse is generated which, upon application, through appropriate components, to a pair of controlled-ignition discharge devices, causes said discharge devices to reverse the connections between the capacitor and the load circuit, thereby causing said capacitor to be recharged with its original polarity. As a result, the energy which has heretofore been wasted is conserved.

In the accompanying specification I shall describe, and in the annexed drawing show, an illustrative embodiment of the welding systems of my present invention. It is, however, to be clearly understood that I do not wish to be limited to the details herein shown and described for purposes of illustration only, inasmuch as changes therein may be made without the exercise of invention and within the true spirit and scope of the claims hereto appended.

In said drawing,

Fig. 1 is a circuit diagram of a welding system assembled in accordance with the principles of my present invention; and Fig. 2 is a current-voltage versus time graph of said welding system.

Referring now more in detail to the aforesaid illustrative embodiment of my present invention, and with particular reference to the drawing

2 illustrating the same, the numeral 5 generally designates a welding transformer. Said transformer includes a primary winding tapped, as at 6, to divide the same into winding portions 7 and 8. Said transformer also includes a secondary winding 9 which may be coupled to a resistance-welding load 10.

A capacitor 11, having terminals 12 and 13, is connected, through conductors 14 and 15, across a source 16 of D. C., whereby said capacitor may be charged, through a current-limiting resistor 17, to a value appropriate for resistance welding.

The capacitor terminal 12 is, it will be noted, connected to the positive side of D. C. source 16, and it is also connected, through a conductor 18, to the tap 6 of the primary winding of the transformer 5.

The capacitor terminal 13 is connected, through a conductor 19, to the pool cathode 20 of a controlled-ignition discharge tube 21 which includes, in addition to the cathode 20, an igniting electrode 22 and an anode 23. The anode 23 is connected, through a conductor 24, to the outer terminal of the primary winding portion 7 of the transformer 5.

The capacitor terminal 13 is also connected, through a conductor 25, to the anode 26 of a second controlled-ignition tube 27, the latter having an igniting electrode 28 and a pool cathode 29. Said cathode 29 is connected, through a conductor 30, to the outer terminal of the primary winding portion 8 of the transformer 5.

It will be noted that the tubes 21 and 27 are oppositely disposed with respect to each other, and that their connections in the circuit are such, as will later be more fully explained, as to permit the capacitor 11 to discharge through the tube 21, and become recharged, by the energy stored in the system as a result of said discharge, through the tube 27.

The tubes 21 and 27 are, of course, initially non-conducting, and in order to effectuate the discharge of the capacitor 11 through the tube 21, I proceed as follows.

A capacitor 31 is charged, through a current-limiting resistor 32, from a D. C. source such as a battery 33, one terminal of said capacitor 31 being connected, through a current-limiting resistor 34, to one end of the primary winding 35 of a transformer 36, and the other terminal of said capacitor being connected, through an appropriate switch 37, to the other end of said primary winding. The secondary winding 35' of the transformer 36 is connected, through conductors 38 and 39, respectively, to the cathode 20 and the igniting electrode 22 of the tube 21.

The closing of the circuit through the switch 37 permits the capacitor 31 to discharge and fire the tube 21 and this, in turn, permits the capacitor 11 to discharge through a path, including the conductor 18, the primary winding portion 7 of the transformer 5, the conductor 24, the tube 21, and the conductor 19.

It will be noted, by referring to Fig. 2 of the drawing, that following the time $T_0$, when the tube 21 is fired, the discharge current $I$ rises, and the capacitor voltage $E_c$ drops, the current reaching a maximum and the voltage reaching zero at time $T_1$. At such time, there is considerable energy stored in the system, particularly, in the field about the secondary winding 9 of the transformer 5.

Now, as this field commences to collapse, and the current $I$ commences to decay, the voltage $E_c$ across the capacitor 11 reverses its polarity, and in order to recharge said capacitor with its original polarity and thereby conserve the above-mentioned energy, I proceed as follows.

Connected in shunt with the capacitor 11 is a gas-discharge tube 40, having an anode 41 connected, through a conductor 42, to the capacitor terminal 13, and a cathode 43 connected, through a conductor 44, to one terminal of a primary winding 45 on a transformer 46, the other terminal of said primary winding being connected, through a conductor 47, to the capacitor terminal 12.

The transformer 46 is provided with two secondary windings 48 and 49. The winding 48 is connected, through conductors 50 and 51, respectively, to the igniting electrode 28 and the cathode 29 of the discharge tube 27. The winding 49 is connected, through conductors 52 and 53, respectively, to the cathode 54 and the grid 55 of a normally non-conducting, grid-controlled, gas-discharge tube 56.

The tube 56 includes an anode 57 which is tied, through a conductor 58, to the anode 23 of the tube 21, and the cathode 54 of the tube 56 is connected, through a capacitor 59 and an inductor 60, to the cathode 29 of said tube 21. The capacitor 59 is adapted to be charged, through a current-limiting resistor 61, from a D. C. source, such as a battery 62.

Now, as above described, following the discharge of the capacitor 11 through the welding-circuit load, said capacitor commences to recharge with a reversed polarity. However, before the reverse voltage can become appreciable, the tube 40, which is across the capacitor, becomes conductive and said capacitor discharges through said tube and the primary winding 45 of the transformer 46.

The resulting voltage pulses induced in the secondary windings 48 and 49 do two things; that induced in the winding 48 fires the tube 27, and that induced in the winding 49 triggers the tube 56. When the latter becomes conducting, the capacitor 59 seeks to discharge therethrough, and because of the polarity of its original charge, it extinguishes the tube 21.

When the tube 27 is fired and the tube 21 is extinguished, the energy stored in the system, as above described, takes a path from the tap 6 of the primary winding of the transformer 5, through the conductor 18, the capacitor 11, the conductor 25, the tube 27, and the conductor 30, back to said transformer primary.

Thus, the capacitor 11 becomes, as will be noted at time $T_2$ in Fig. 2 of the drawing, recharged with its original polarity. Of course, such polarity quickly extinguishes the tube 40, and eventually extinguishes the tube 27.

This completes the description of the aforesaid illustrative embodiment of my present invention. It will be noted from all of the foregoing that, by means of my present invention, energy which heretofore has been wasted in recharging the capacitor of a welding system with a reversed polarity is conserved by reversing the connections between said capacitor and the welding-circuit load, whereby said energy is caused to recharge said capacitor with its original polarity.

Other objects and advantages of my present invention will readily occur to those skilled in the art to which the same relates.

What is claimed is:

1. A welding system comprising: a capacitor; means for charging said capacitor; a welding-load circuit; means for discharging said capacitor through said welding-load circuit with a unidirectional pulse of current; and means for altering the connections between said capacitor and said welding-load circuit when said pulse of current reaches substantially its maximum value, whereby as the energy stored in said system as a result of said pulse of current continues the flow thereof in the same direction, said capacitor is recharged with its original polarity.

2. A welding system comprising: a capacitor; means for charging said capacitor; a welding-load circuit; means, including a controlled-ignition discharge device for discharging said capacitor through said welding-load circuit with a unidirectional pulse of current; and means for altering the connections between said capacitor and said welding-load circuit when said pulse of current reaches substantially its maximum value, whereby as the energy stored in said system as a result of said pulse of current continues the flow thereof in the same direction, said capacitor is recharged with its original polarity.

3. A welding system comprising: a capacitor; means for charging said capacitor; a welding-load circuit; means, including a controlled-ignition discharge device, for discharging said capacitor through said welding-load circuit with a unidirectional pulse of current; and means for simultaneously extinguishing said discharge device and altering the connections between said capacitor and said welding-load circuit when said pulse of current reaches substantially its maximum value, whereby as the energy stored in said system as a result of said pulse of current continues the flow thereof in the same direction, said capacitor is recharged with its original polarity.

4. A welding system comprising: a capacitor; means for charging said capacitor; a welding transformer; said transformer having its primary winding tapped to divide the same into two portions; means connected in series with said capacitor and one of said winding portions for permitting said capacitor to be discharged through said last-named winding portion; means connected in series with said capacitor and the other of said winding portions for permitting said capacitor to be recharged with its original polarity by the energy stored in said system as a result of said discharge current; and means for reversing the polarities of the connections between said capacitor and said second and third-named means when said discharge current reaches substantially its maximum value.

5. A welding system comprising: a capacitor; means for charging said capacitor; a welding transformer; said transformer having its primary winding tapped to divide the same into two portions; a controlled-ignition discharge device connected in series with said capacitor and one of said winding portions for permitting said capacitor to be discharged through said last-named winding portion; means connected in series with said capacitor and the other of said winding portions for permitting said capacitor to be recharged with its original polarity by the energy stored in said system as a result of said discharge current; and means for reversing the polarities of the connections between said capacitor, said discharge device, and said last-named means when said discharge current reaches substantially its maximum value.

6. A welding system comprising: a capacitor; means for charging said capacitor; a welding transformer; said transformer having its primary winding tapped to divide the same into two portions, means connected in series with said capacitor and one of said winding portions for permitting said capacitor to be discharged through said last-named winding portion; a controlled-ignition discharge device connected in series with said capacitor and the other of said winding portions for permitting said capacitor to be recharged with its original polarity by the energy stored in said system as a result of said discharge current; and means for reversing the polarities of the connections between said capacitor, said second-named means, and said discharge device when said discharge current reaches substantially its maximum value.

7. A welding system comprising: a capacitor; means for charging said capacitor; a welding transformer; said transformer having its primary winding tapped to divide the same into two portions; a controlled-ignition discharge device connected in series with said capacitor and one of said winding portions for permitting said capacitor to be discharged through said last-named winding portion; a second controlled-ignition discharge device connected in series with said capacitor and the other of said winding portions for permitting said capacitor to be recharged with its original polarity by the energy stored in said system as a result of said discharge current; and means for reversing the polarities of the connections between said capacitor and said discharge devices when said discharge current reaches substantially its maximum value.

8. A welding system comprising: a capacitor; means for charging said capacitor; a welding transformer; said transformer having its primary winding tapped to divide the same into two portions; means connected in series with said capacitor and one of said winding portions for permitting said capacitor to be discharged through said last-named winding portion; means connected in series with said capacitor and the other of said winding portions for permitting said capacitor to be recharged with its original polarity by the energy stored in said system as a result of said discharge current; and means for simultaneously rendering said second-named means inoperative and said third-named means operative when said discharge current reaches substantially its maximum value.

9. A welding system comprising: a capacitor; means for charging said capacitor; a welding transformer; said transformed having its primary winding tapped to divide the same into two portions; a controlled-ignition discharge device connected in series with said capacitor and one of said winding portions for permitting said capacitor to be discharged through said last-named winding portion; a second controlled-ignition discharge device connected in series with said capacitor and the other of said winding portions for permitting said capacitor to be recharged with its original polarity by the energy stored in said system as a result of said discharge current; and means for simultaneously extinguishing said first-named discharge device and firing said second-named discharge device when said discharge current reaches substantially its maximum value.

10. A welding system comprising: a capacitor; means for charging said capacitor; a welding transformer; said transformer having its primary winding tapped to divide the same into two portions; means connected in series with said capacitor and one of said winding portions for permitting said capacitor to be discharged through said last-named winding portion; means connected in series with said capacitor and the other of said winding portions for permitting said capacitor to be recharged with its original polarity by the energy stored in said system as a result of said discharge current; a pulse generator connected across said capacitor; and means for applying said pulse to said second and third-named means to simultaneously render said second-named means inoperative and said third-named means operative when said discharge current reaches substantially its maximum value.

11. A welding system comprising: a capacitor; means for charging said capacitor; a welding transformer; said transformer having its primary winding tapped to divide the same into two portions; a controlled-ignition discharge device connected in series with said capacitor and one of said winding portions for permitting said capacitor to be discharged through said last-named winding portion; a second controlled-ignition discharge device connected in series with said capacitor and the other of said winding portions for permitting said capacitor to be recharged with its original polarity by the energy stored in said system as a result of said discharge current; a pulse generator connected across said capacitor; and means for applying said pulse to said discharge devices to simultaneously extinguish said first-named discharge device and fire said second-named discharge device when said discharge current reaches substantially its maximum value.

12. A welding system comprising: a capacitor; means for charging said capacitor; a welding-load circuit; means for discharging said capacitor through said welding-load circuit with a unidirectional pulse of current; means for recharging said capacitor with its original polarity by the energy stored in said system as a result of said pulse of current; and means, operable upon said stored energy tending to reverse the initial polarity of said capacitor, for simultaneously rendering said second-named means inoperative and said third-named means operative.

HANS KLEMPERER.

REFERENCES CITED

The following references are of record in the file of this patent:

UNITED STATES PATENTS

| Number | Name | Date |
| --- | --- | --- |
| 2,269,460 | Klemperer | Jan. 13, 1942 |
| 2,278,431 | Klemperer | Apr. 7, 1942 |